US011539759B2

United States Patent
Lohmar et al.

(10) Patent No.: US 11,539,759 B2
(45) Date of Patent: Dec. 27, 2022

(54) APPARATUSES, METHODS, COMPUTER PROGRAMS, AND COMPUTER PROGRAM PRODUCTS FOR FLUS REMOTE CONTROL CHANNELS

(71) Applicant: Telefonaktiebolaget LM Ericsson (publ), Stockholm (SE)

(72) Inventors: Thorsten Lohmar, Aachen (DE); Ali El Essaili, Aachen (DE); Mohamed Ibrahim, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 2 days.

(21) Appl. No.: 17/283,640

(22) PCT Filed: Oct. 9, 2019

(86) PCT No.: PCT/IB2019/058615
§ 371 (c)(1),
(2) Date: Apr. 8, 2021

(87) PCT Pub. No.: WO2020/075096
PCT Pub. Date: Apr. 16, 2020

(65) Prior Publication Data
US 2021/0352114 A1    Nov. 11, 2021

Related U.S. Application Data

(60) Provisional application No. 62/743,393, filed on Oct. 9, 2018.

(51) Int. Cl.
*G06F 15/16* (2006.01)
*H04L 65/1069* (2022.01)
(Continued)

(52) U.S. Cl.
CPC ........ *H04L 65/1069* (2013.01); *H04L 65/613* (2022.05); *H04N 21/2187* (2013.01)

(58) Field of Classification Search
CPC ............ H04L 65/1069; H04L 65/4092; H04N 21/2187
See application file for complete search history.

(56) References Cited

U.S. PATENT DOCUMENTS

2005/0267946 A1   12/2005   An et al.
2006/0176374 A1    8/2006   Oklejas
2018/0367579 A1*  12/2018   Kolan ................ H04L 65/1104

OTHER PUBLICATIONS

Editor (Ericsson LM):"Framework for Live Uplink Streaming Permanent Document", 3GPP Draft;3rd Generation Partnership Project (3QPP), Mobile Competence Centre ;France vol. SA WG4, No. Albuquerque, New Mexico, USA; Nov. 13, 2017-Nov. 17, 2017; Nov. 12, 2017. (Year: 2017).*

(Continued)

*Primary Examiner* — Suraj M Joshi
*Assistant Examiner* — Jaren Means
(74) *Attorney, Agent, or Firm* — Rothwell, Figg, Ernst & Manbeck, P.C.

(57) ABSTRACT

A method, performed by a source control entity, for controlling delivery of a media source to a media sink, is provided. The method includes: the source control entity sending an indication of availability for streaming; the source control entity establishing connections with one or more controller nodes; the source control entity receiving a first command from one of the one or more controller nodes; and the source control entity relaying the first command to the media source.

16 Claims, 9 Drawing Sheets

(51) Int. Cl.
*H04N 21/2187* (2011.01)
*H04L 65/613* (2022.01)

(56) References Cited

OTHER PUBLICATIONS

International Search Report and Written Opinion issued in International Application No. PCT/IB2019/058615 dated Nov. 27, 2019 (10 pages).
IPRP issued in International Application No. PCT/IB2019/058615 dated Mar. 2, 2021 (26 pages).
Editor (Ericsson LM), "Framework for Live Uplink Streaming Permanent Document", 3GPP TSG SA4#96, Tdoc S4-171130, Nov. 13-17, 2017, Albuquerque, New Mexico, USA (48 pages).
3GPP TS 26.238, V15.1.0 (Mar. 2018), 3rd Generation Partnership Project; Technical Specification Group Services and System Aspects; Uplink Streaming (Release 15), Mar. 2018 (32 pages).
3GPP TR 26.939, V15.1.0 (Sep. 2018), 3rd Generation Partnership Project; Technical Specification Group Services and System Aspects; Guidelines on the Framework for Live Uplink Streaming (FLUS); (Release 15), Sep. 2018 (30 pages).

* cited by examiner

APPARATUSES, METHODS, COMPUTER PROGRAMS, AND COMPUTER PROGRAM PRODUCTS FOR FLUS REMOTE CONTROL CHANNELS

CROSS REFERENCE TO RELATED APPLICATION(S)

This application is a 35 U.S.C. § 371 National Stage of International Patent Application No. PCT/IB2019/058615, filed on Oct. 9, 2019, which claims priority to U.S. provisional patent application No. 62/743,393, filed on Oct. 9, 2018. The above identified applications are incorporated by this reference.

TECHNICAL FIELD

Disclosed are embodiments related to the Framework for Live uplink Streaming (FLUS), including FLUS remote control channels.

BACKGROUND

3GPP SA4 has defined the Framework for Live uplink Streaming (FLUS) in 3GPP TS 26.238. A guideline document is available in 3GPP TR 26.939.

FLUS contains an IMS and a Non-IMS based instantiation. In case of the Non-IMS based instantiation the FLUS source can provision the FLUS sink using HTTP Rest APIs. The provisioning procedure (Using F-C) is openly defined. At minimum, the FLUS Source should provision the FLUS media instantiation (e.g. "org:3gpp:flus:2018:instantiations: fmp4"). In return, the FLUS Source gets an Ingest Point description in form of a Push URL (e.g. http://sink.operator.com/sessionxyz/).

Figure 1:
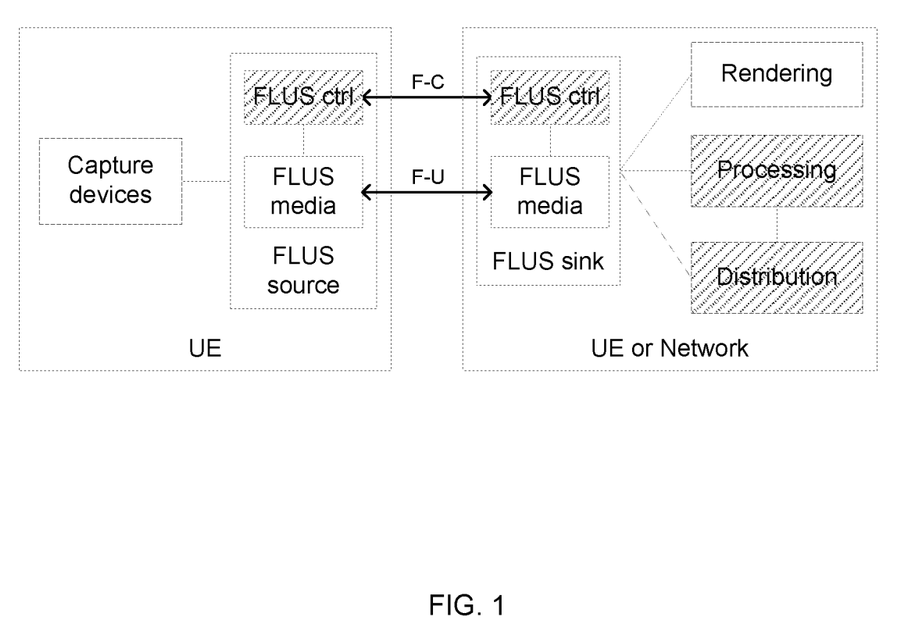
FIG. 1 illustrates a FLUS architecture according to related art.

FIG. 1 illustrates the current FLUS architecture, where the user and control planes of the FLUS source and sink are co-located on the same device. The F reference point connects a FLUS source and a FLUS sink. The F reference point enables the FLUS source to establish and control a single FLUS session. The F reference point also enables the FLUS sink and the FLUS source to mutually authenticate and authorize each other.

FLUS ctrl and F-C describe control plane functionality including the associated processing by FLUS sink of the uploaded media for subsequent downstream distribution, plus FLUS media instantiation selection. F-C may also support configuration of static metadata for the session. FLUS media and F-U describe user plane functionality which includes setup of one or more media sessions and subsequent media data transmission via media streams.

F-C is used to establish and control the FLUS session. F-C allows the FLUS source to select a FLUS media instantiation, provision static metadata associated with each media session present in the FLUS session, and select and configure the processing and distribution sub-functions. The FLUS media instantiation is defined as part of the FLUS session. The user plane (F-U) may also contain the media stream establishment procedures when needed. Multiple media streams may be established for one FLUS session.

SUMMARY

For the Non-IMS based FLUS instantiation, there is no mechanism defined to provide commands from the FLUS Sink to the FLUS source. In embodiments, such a mechanism, e.g. a command or recommendation channel, is referred to as a "Remote Control" channel in the following description.

There is a one-to-one relation between the FLUS Media components on the FLUS Source and the FLUS Sink. However, there may be different network entities, which can remote control the FLUS source (control plane parts), e.g. in form of commands like start/stop or in form of recommendations like to increase the bitrate. Some commands may be targeted to the encoding process (e.g., increase bitrate or change resolution). Some commands may target the actual capture device (e.g., camera), such as pan or zoom. These commands might, however, come from different entities in the network, e.g., pan or zoom could originate from a remote production studio and bit-rate increase could originate from a control function inside the network.

The advantage provided by some embodiments is to allow different types of remote control commands from different end-points. Different end-points may be authorized to give remote control commands, including all possible commands or some limited subset of such commands. For example, a FLUS source may establish remote control channels to a first F-RC end-point, which is collocated with the F-U end-point (FLUS sink media). This F-RC end-point is (in this example) authorized to have full control over capture and the encoding processes, like start and stop. The FLUS Source (subdivided into a FLUS source media and FLUS source control, as shown in FIG. 1) may establish remote control connections (F-RC) to a second end-point, which is only authorized to influence the encoding bitrate. The FLUS Source is ignoring any other commands from the second end-point. The FLUS Source may establish a remote control connection (F-RC) to a third end-point, which is only authorized to influence the camera, e.g. by way of commands affecting Pan, Zoom, shutter speed, and so forth. The F-C (or F-RC) end-points might be distributed at different locations, such as a remote production studio for capturing/stopping/zooming, and inside the network for adapting the bitrate.

Embodiments allow the instantiation of multiple FLUS Ctrl instances which are connected to one FLUS media sink and multiple F-RC instances to one FLUS Source. This extends the current FLUS architecture and allows for controlling the FLUS source from multiple end-points. Embodiments have no impact on the processing and distribution functions at the UE, which get data from the FLUS media sink. There may be different remote control channel realizations, such as WebSocket-based or HTTP-Pull-based channels. Further, there may be different remote control command sets (e.g., command sets related to camera operation, or encoding processes, or grouped in some other fashion).

According to some embodiments, there may be multiple Control Plane entities for a single FLUS User Plane entity (FLUS source media and FLUS sink media). Some Control Plane Entities may use just provisioning procedures (F-C), while some others may use "remote control" procedures (using F-RC).

Different Remote Control (F-RC) authorization levels may be defined. Some F-RC entities may only be allowed to change the encoding procedure (e.g. bitrate, resolution, codec configuration) for FLUS media. Other F-RC entities may be allowed to start/stop/pause the FLUS Media. Other levels of authorization may also be used.

In the simplest case, there is one FLUS F-C entity (without any FLUS F-RC entity) for one FLUS F-U entity. In other deployments, there may be additional (even more than one) F-RC entities per F-U located within the FLUS Source. The peer entities may be located in different nodes.

In embodiments, upon provisioning, the FLUS Source immediately establishes the F-RC (remote) control sessions. When more than one F-RC control session is configured, the FLUS Source is establishing the connection to each. A F-RC remote control connection may be realized by a web socket or other client initiated push schemes. The FLUS Source may receive time-stamped remote control commands E.g. the FLUS sink may send a F-U media session start time prior to the event. Without a timestamp, the FLUS Source is immediately executing the received remote control command Remote control commands may be start media session, stop media session, change codec configuration (resolution, bitrate), pause, pan or zoom of the camera, among other possible commands.

According to a first aspect, a method, performed by a source control entity, for controlling delivery of a media source to a media sink, is provided. The method includes: the source control entity sending an indication of availability for streaming; the source control entity establishing connections with one or more controller nodes; the source control entity receiving a first command from one of the one or more controller nodes; and the source control entity relaying the first command to the media source.

In some embodiments, the method further includes the source control entity verifying that the one of the one or more controller nodes is authorized to issue the first command prior to relying the first command to the media source. In some embodiments, the one or more controller nodes includes a first controller node authorized to send commands to control a camera associated with the media source and a second controller node authorized to send commands to affect a bitrate associated with the media source. In some embodiments, the one or more controller nodes are located remotely from the source control entity.

According to a second aspect, a source control entity is provided, being adapted to: send an indication of availability for streaming; establish connections with one or more controller nodes; receive a first command from one of the one or more controller nodes; and relay the first command to the media source.

According to a third aspect, a source control entity is provided, the source control entity including: a sending module configured to send an indication of availability for streaming; an establishing module configured to establish connections with one or more controller nodes; a receiving module configured to receive a first command from one of the one or more controller nodes; and a relay module configured to relay the first command to the media source.

According to a fourth aspect, a computer program is provided, comprising instructions which, when executed on at least one processor, causes the at least one processor to carry out the method according to any one of embodiments of the first aspect.

According to a fifth aspect, a carrier is provided comprising the computer program of the fourth aspect, wherein the carrier is one of an electronic signal, optical signal, radio signal or computer readable storage medium The above and other embodiments are described below.

BRIEF DESCRIPTION OF THE DRAWINGS

The accompanying drawings, which are incorporated herein and form part of the specification, illustrate various embodiments.

DETAILED DESCRIPTION

Figure 2:
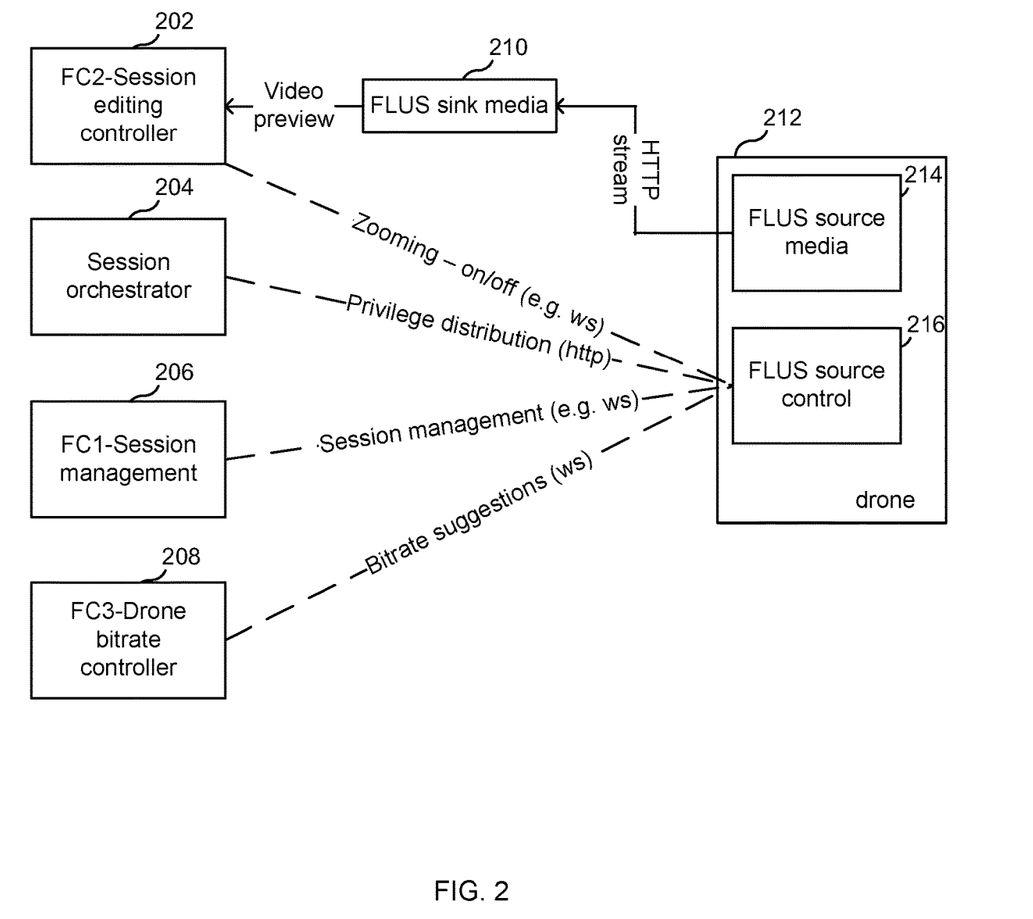
FIG. 2 illustrates a FLUS architecture according to some embodiments.

An embodiment is now described. According to this embodiment, the FLUS framework is orchestrated via various nodes. For this example, we assume here that three nodes are controlling multiple FLUS sources, in this case the FLUS source resides in a flying drone covering an outdoor event. The involved nodes are depicted in FIG. 2, and described below. More of fewer nodes are possible, and different scenarios than a flying drone covering an outdoor event are encompassed by the disclosed embodiments.

Session orchestrator 204: This node 204 could be in the edge or the origin of the cloud, and it is responsible for announcing the addresses and privileges of different control nodes. The node 204 distributes the information to the FLUS source control node 216 via any text descriptor format (e.g., JSON/XML). The node 204 is considered as the entry point that connect the FLUS source 212 with other FLUS control units.

FC1—session management 206: This node 206 can be in the operator or the content provider cloud. The node 206 is responsible for handling any changes in the FLUS control nodes (e.g. handover), and may be connected to the FLUS Source Control 216 via using a persistent push mechanism for remote control (e.g WebSocket). That is, the node 206 may be connected by a remote control connection, i.e. F-RC.

FC2—FLUS session editing controller 202: This node 202 is responsible for managing the FLUS sources 212 in terms of video editing (i.e. uses a remote control connection). It can send zooming commands (such as zoom-in or zoom-out), or change a location or angle of view to a specific FLUS source 212. The node 202 may also be responsible to pause/resume a stream according to the stream needs. The node 202 can be part of the content owner cloud, can be deployed in the operator edge (if low latency is needed), or can be in a third-party cloud. The node 202 may be connected to the FLUS Source Control 216 via persistent push mechanism for remote control (e.g WebSocket). That is, the node may be connected by a remote control connection, i.e. F-RC.

FC-3 Drone bitrate controller 208: This node 208 is responsible for controlling the stream bitrate. The node 208 may provide a suggested bitrate e.g. based on the current (or expected) load on the network. This node 208 can be deployed in the operator cloud and may retrieve information on network status from the operator. The node 208 is connected to the FLUS Source Control 216 via persistent push mechanism for remote control (e.g WebSocket). That is, the node 208 may be connected by a remote control connection, i.e. F-RC.

FLUS source controller 216 (called in TS 26.238 FLUS CTRL): This node 216 is responsible for communicating with the above-mentioned nodes, and may be deployed inside the FLUS source 212. The node 216 may also be split into the F-C handling part (e.g. HTTP GET) and the F-RC handling parts (e.g. web socket).

FLUS source media 214 (called in TS 26.238 FLUS Media): This node 214 may send media streams to the FLUS sink 210. The node 214 may be deployed inside the FLUS source 212 (e.g., the drone).

Flus sink media 210 (FLUS media in TS 26.238): This node 210 may receive media streams from the FLUS source 212.

Figure 3:
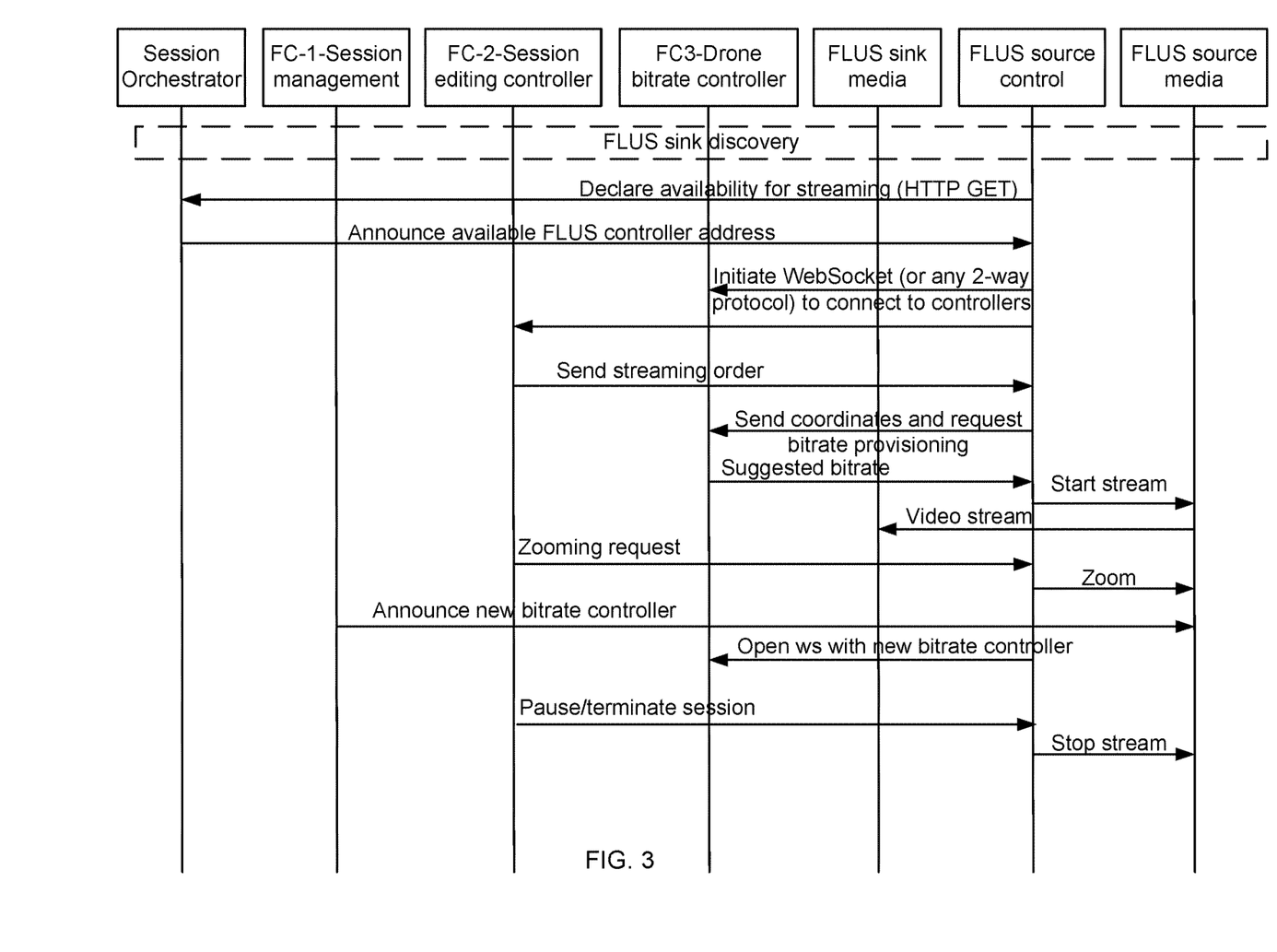
FIG. 3 is a call flow diagram according to some embodiments.

FIG. 3 illustrates a call flow for the various nodes functionalities, according to an embodiment. The nodes illustrated in FIG. 3 correspond to the nodes 202, 204, 206, 208, 210, 212, 214, 216 described with respect to FIG. 2 above. An example of the call-flow is now described.

The FLUS source control 216 sends an indication that the FLUS source control 216 is available for streaming to the session orchestrator 204 in the form of an HTTP GET (e.g. http://orchasterator ip:9031/GetConfig?token=hmm).

The Session orchestrator 204 replies with a configuration file. The file should contain the address of the different controller nodes (e.g., FC1 206, FC2 202, FC3 208) that are participating in controlling the session and are authorized to influence the FLUS Source 212. The session is described in detail after the call-flow.

The FLUS source control 216 uses the configuration file to establish connections with all involved controllers:FC1 206, FC2 202 and FC3 208 (in this example). The connections FC1 to FC3 are used to receive remote control commands (note, there are separate command authorization instructions). The connection can be WebSocket or any other persistent PUSH or 2-way communication mechanism.

The FC-2 session editing controller 202 is controlling the FLUS source video capabilities. It checks the FLUS source situation and schedules a session for starting the stream. Such information can include zoom, viewing angle, area covered and duration of the session (any information related to the session directory process). The FC-2 session editing controller 202 can start the streaming process by sending a "Start streaming" order to the FLUS source control 216.

The FLUS source controller 216 shares its current location (geographical or virtual point of presence) with FC3 208. FC3 208 analyzes the network situation and suggests a specific bitrate profile.

The FLUS source media 214 (part of the FLUS source 212) starts streaming media to the FLUS sink 210.

FC2 202 sends e.g. zoom instructions or position change instruction to the FLUS source 212 via websockets.

FLUS source 212 shares its status continuously with each of the different FCs 202, 206, 208.

FC1 206 detects that FLUS source 212 is leaving an area of service for FC3 208, and therefore it sends information via websocket (ws) to the FLUS source with the new serving FC3 208.

FC 2 202 decides to pause the stream from the FLUS source 212 and activate another stream, so it sends a pause command to the source 212.

FC2 202 decides to terminate the session, so it sends a session termination to the FLUS source 212.

The FLUS source 212 terminates all (ws) sessions.

Such description is not limited to the mentioned controller, but it can includes different types of controllers depending on the use-case.

An example of the configuration file is now described. The configuration file could be an XML or JSON file which is describing the location, the functionality and access rights (authorization information) for each stream/each remote controller and which protocol it uses.

An example of the configuration file may be as follows:
{["control ID": "FC1", "on/off": 0, "change location": 1, "change bitrate": 0, "location": ["ip/ws_ctrl"], "connect type":[ws] "location":http://ip/fc1/], ["control ID": "FC2", "on/off": 1, "change location": 0, "change bitrate": 0, "location": ["ip/ws_ctrl"], "connect type": [ws] "location":http://ip/fc2/]]}

Figure 4:
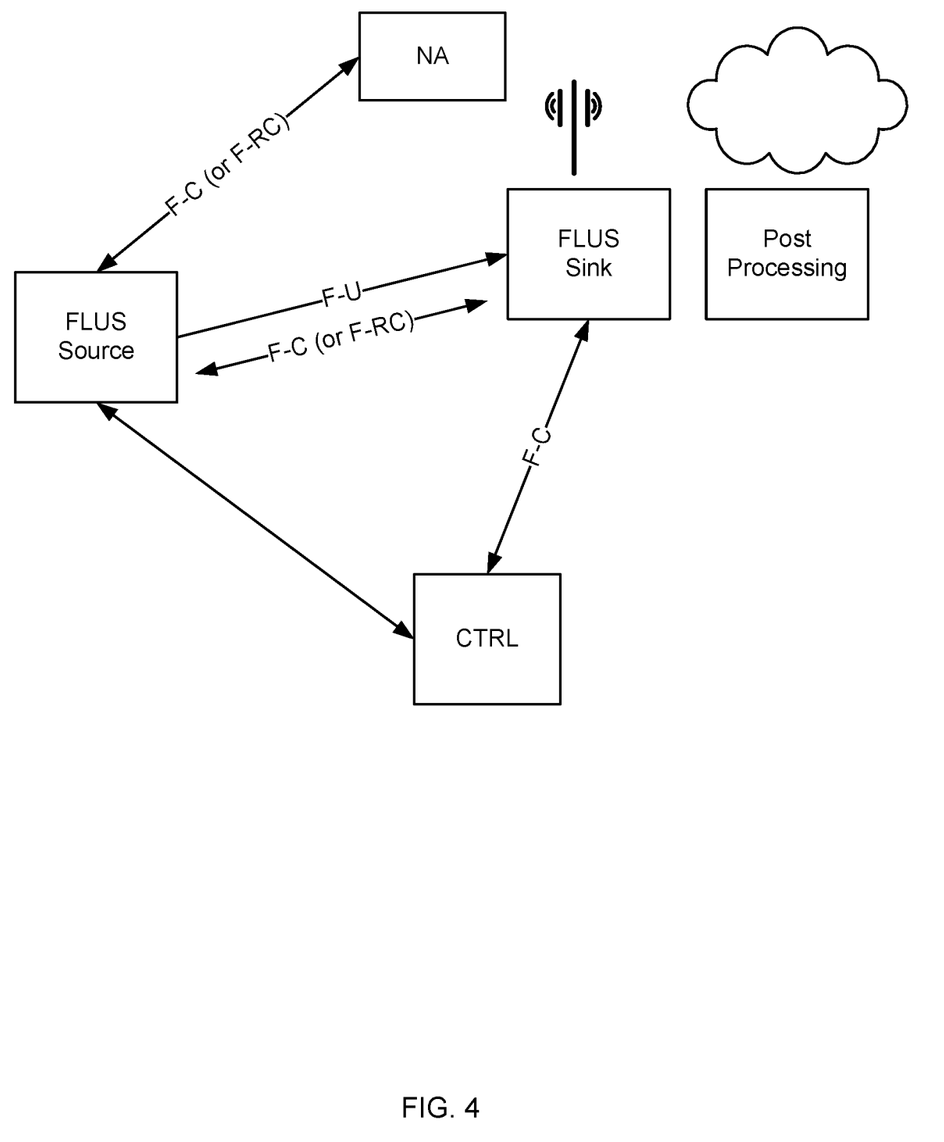
FIG. 4 illustrates a FLUS architecture according to some embodiments.
Figure 5:
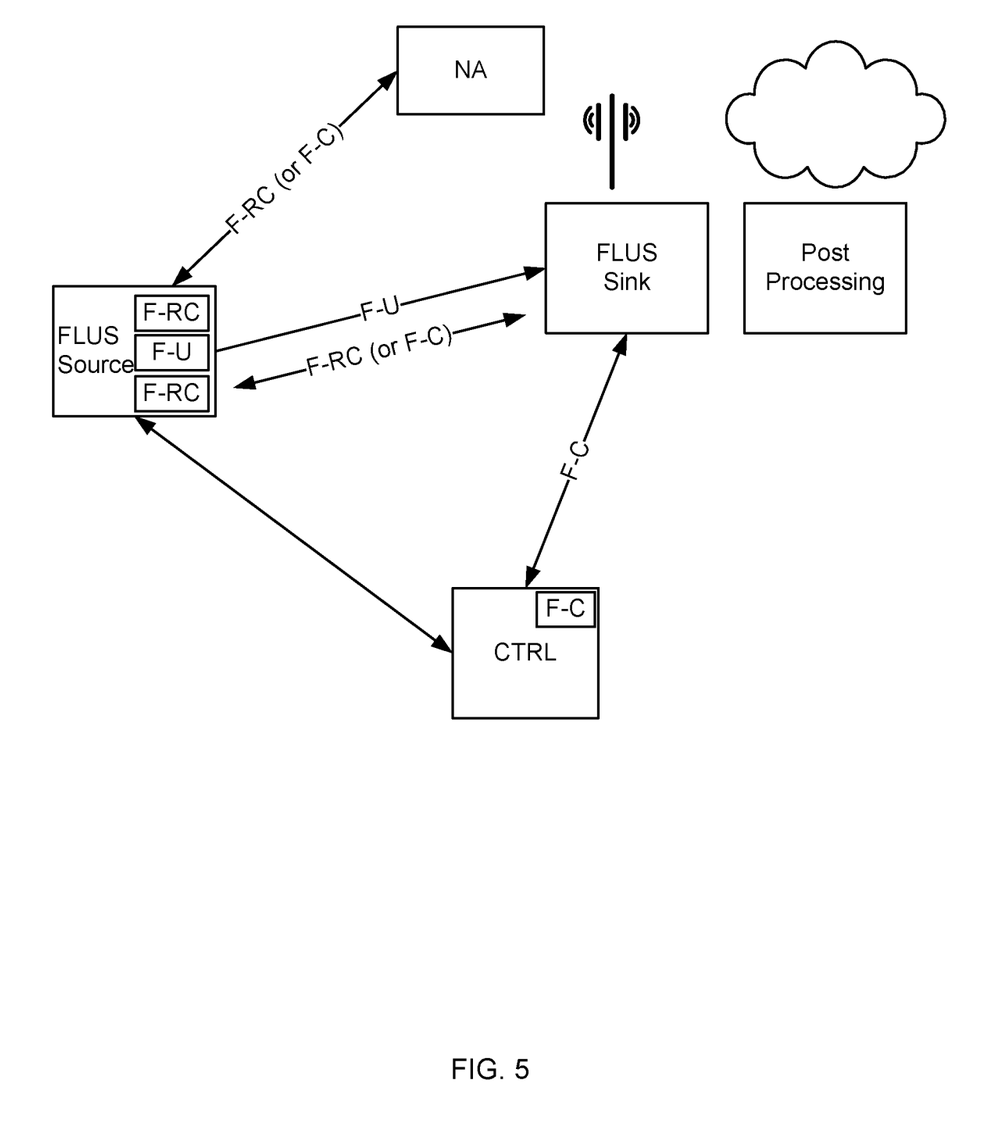
FIG. 5 illustrates a FLUS architecture according to some embodiments.
Figure 6:
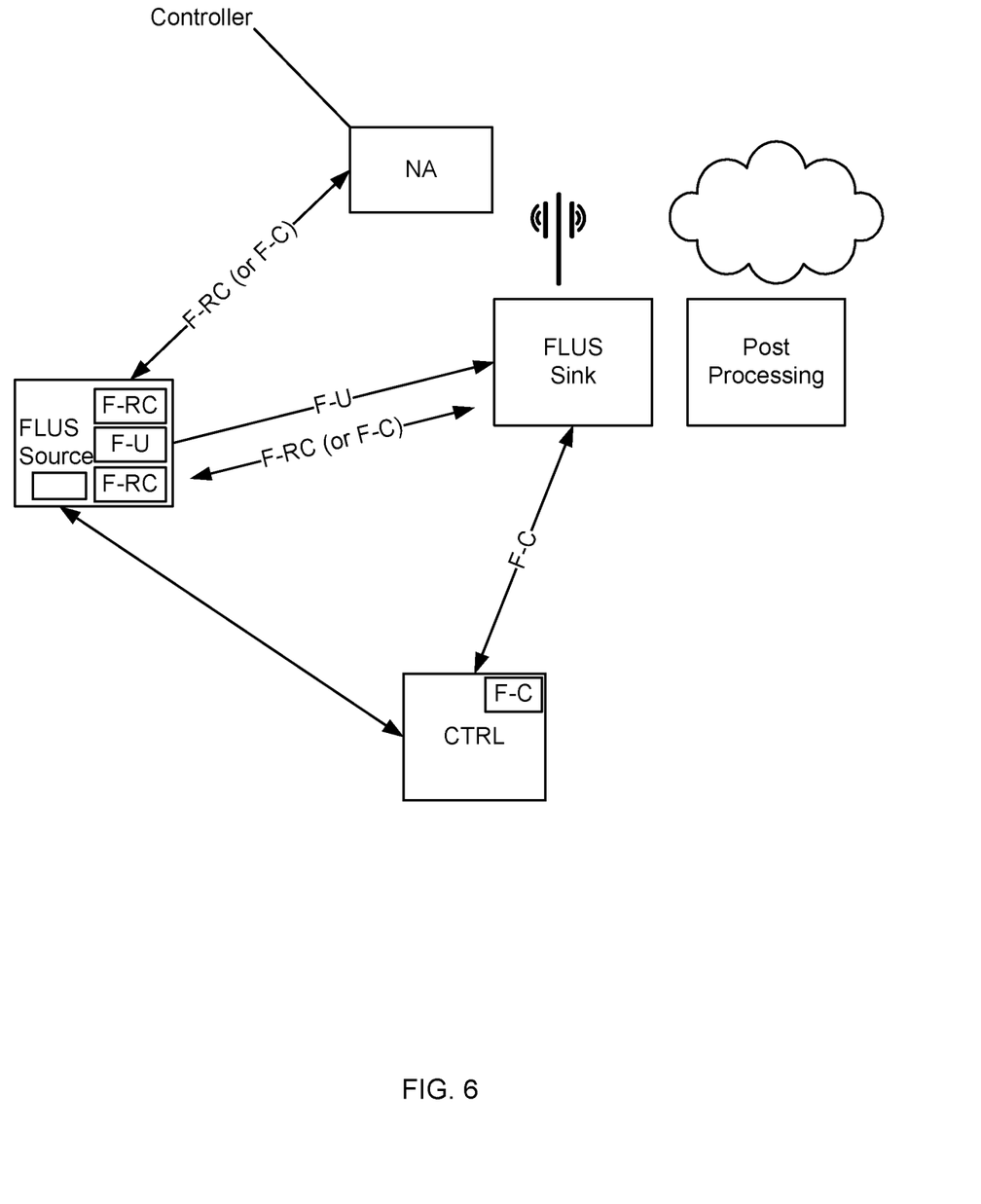
FIG. 6 illustrates a FLUS architecture according to some embodiments.

FIGS. 4-6 are additional illustrations of example architectures.

Figure 7:
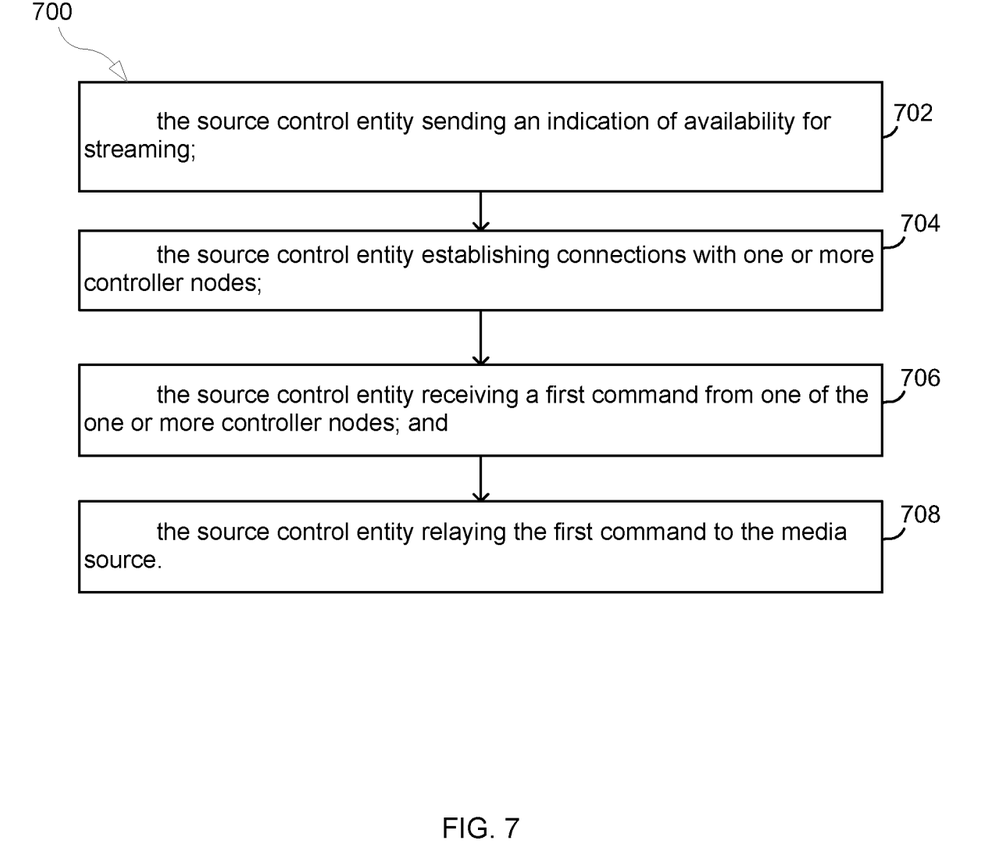
FIG. 7 illustrates a flow chart according to some embodiments.

FIG. 7 illustrates a process 700 according to some embodiments. Process 700 is a method, performed by a source control entity, for controlling delivery of a media source to a media sink. The method includes the source control entity sending an indication of availability for streaming (step 702); the source control entity establishing connections with one or more controller nodes (step 704); the source control entity receiving a first command from one of the one or more controller nodes (step 706); and the source control entity relaying the first command to the media source (step 708).

In some embodiments, the method further includes the source control entity verifying that the one of the one or more controller nodes is authorized to issue the first command prior to relying the first command to the media source. In embodiments, the one or more controller nodes includes a first controller node authorized to send commands to control a camera associated with the media source and a second controller node authorized to send commands to affect a bitrate associated with the media source. In embodiments, the one or more controller nodes are located remotely from the source control entity.

In some embodiments, the source control entity may be, for example FLUS source control node 216. In some embodiments, the source control entity may be part of a FLUS source that is subdivided into a FLUS source media and the FLUS source control, such as FLUS source 212. In some embodiments, the source control entity sends the indication of availability for streaming to a session orchestrator. In some embodiments, the one or more controller nodes include one or more of an editing controller, a session management controller, and a bitrate controller. In some embodiments, one or more of the one or more controller nodes is remote from the source control entity.

Figure 8:
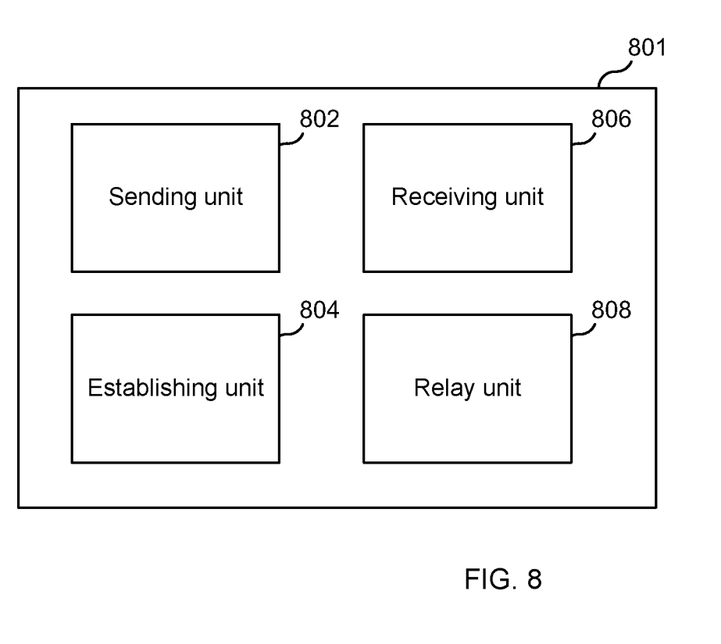
FIG. 8 is a diagram showing functional modules of a UE according to some embodiments.

FIG. 8 is a diagram showing functional modules of node 801 (e.g. a FLUS Source Control, F-C) according to some embodiments. As shown in FIG. 8, node 801 includes a sending unit 802, an establishing unit 804, a receiving unit 806, and a relay unit 808. Sending unit 802 is configured to send an indication of availability for streaming; establishing unit 804 is configured to establish connections with one or more controller nodes; receiving unit 806 is configured to receive a first command from one of the one or more controller nodes; and relay unit 808 is configured to relay the first command to the media source.

Figure 9:
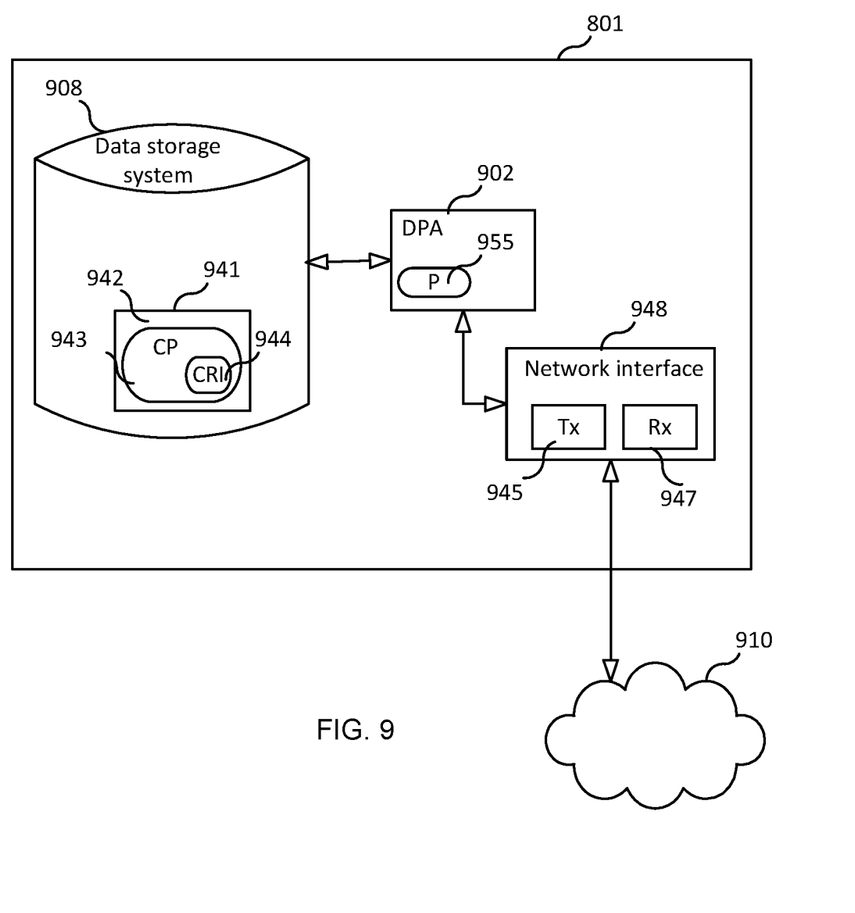
FIG. 9 is a block diagram of a node according to some embodiments.

FIG. 9 is a block diagram of node 801 according to some embodiments. As shown in FIG. 9, node 801 may comprise: a data processing apparatus (DPA) 902, which may include one or more processors (P) 955 (e.g., a general purpose microprocessor and/or one or more other processors, such as an application specific integrated circuit (ASIC), field-programmable gate arrays (FPGAs), and the like); a transmitter 905 and a receiver 904 coupled to an antenna 922 for enabling node 801 to transmit data to and receive data from an AN node (e.g., base station); and local storage unit (a.k.a., "data storage system") 908, which may include one or more non-volatile storage devices and/or one or more volatile storage devices (e.g., random access memory (RAM)). In embodiments where node 801 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory), and the like. In some embodiments, the CRI 944 of computer program 943 is configured such that when executed by data processing apparatus 902, the CRI causes node 801 to perform steps described above (e.g., steps described above with reference to the flow charts). In other embodiments, node 801 may be configured to perform steps described herein without the need for code. That is, for example, data processing apparatus 902 may consist merely of one or more ASICs. Hence, the features of the embodiments described herein may be implemented in hardware and/or software.

Certain use cases are now provided.

Downlink Distribution of FLUS Content

The here described use-case around "Downlink Distribution of FLUS Content" shows a realization where the FLUS Sink is remote controlling the FLUS Source.

The use case around "Downlink Distribution of FLUS content" combines a FLUS live uplink source with a 3GPP defined distribution system, like PSS or MBMS.

The distribution system is capable of determining the viewership of the session, e.g. using audience measurement mechanisms. For MBMS, the consumption reporting procedure can be leveraged to determine the audience size. There may be other mechanisms to determine the current audience size.

It should be noted, that the application logic, which interacts here with the FLUS Source and the FLUS sink, is not depicted in the reference architecture. The application logic includes use-case and service specific behavior, e.g. is aware about the Distribution System realization. There can be application specific transactions, which are not standardized.

A potential call flow (simplified) is depicted below. The call flow does not further separate the functions on the UE, since the discussion aims at the separation of App specific information and generic information exchange.

1: Pre-requisite: The e2e system is fully provisioned. The FLUS Sink is configured to forward the media plane data to the distribution system, once the FLUS media plane is active. The Processing function in the path may e.g. add additional media representations by transcoding.

At time of FLUS Service activation:

2: The UE establishes a control connection between the FLUS Source and the FLUS Sink (F-C) and optionally also between the UE and the Application Logic Function.

3: The FLUS Source in the UE sends the FLUS media data to the FLUS sink. The FLUS sink forwards the media data to the processing function (which generates additional media representations) to the Distribution System (e.g. a DASH Server). One or more service receivers are fetching data from the Distribution System.

Note, the distribution system realizations and also the connector between the FLUS sink and the distribution system are not in scope for FLUS.

4: The Service Receivers (Client Application, which may include a DASH player) are configured to provide reception feedback to an Audience Measurement system. There may be multiple realizations, how the Audience Measurement System can determine the current receiver size.

5: The Audience Measurement System provides Status Information to the Application Logic, which controls the entire workflow.

6: The application logic interprets the status information. In one example, the application logic may decide to pause the media data from the FLUS Source.

7: The Application Logic can notify the UE about its decision. The realization of the Pause signal can be realized using application specific signaling or as part of F-C.

Drone Mounted Camera Discussion

Another realization is depicted below. Here, the FLUS Sink is enabled to send remote control instructions like start/stop/pause to the FLUS Source.

The transaction between the Control Function (CTRL) and the FLUS Sink are only around service provisioning, like FLUS source authorization, distribution configuration, etc.

Possible Work Flow 1 and 2: The CTRL function (operations console) configures the drone and the FLUS sink (incl Processing and Distribution). As result, the e2e system is fully provisioned.

3: A Control Connection between FLUS Source and FLUS Sink is established.

At Time of FLUS Media Activation

4: The FLUS Sink triggers the start of the start of the FLUS media.

5: The FLUS Source in the UE sends the FLUS media data to the FLUS sink. The FLUS sink forwards the media data to the processing function (which generates additional media representations) to the Distribution System (e.g. a DASH Server).

FLUS and Network Assistance

The idea here is to extend FLUS so that a Network Assistance Node (NAssS) can provide information like rate recommendations into the FLUS Source.

Currently, the rate recommendations are only available for 3GP DASH clients, since defined in TS 26.247.

Observations and Proposals

Observation 1: All three use-case require sending control commands to the FLUS Source (potentially not from the same FLUS Sink).

Observation 2: The Remote Control commands from a Network Assistance function might come from a different node than remote control of camera devices. A different command set may be used for Network Assistance.

Proposals:

It is proposed to include a new remote control interface (The FLUS Sink control the FLUS source) into the FLUS framework for non-IMS based instantiations.

It is proposed to keep rate recommendation and other network assistance functions separate from the FLUS Source remote control. The network assistance may give recommended into to the FLUS source (e.g. bitrate changes, codec re-configuration, etc.), while other functions are authorized to start/stop/pause the FLUS Media or also to influence the capture devices.

It is proposed to update the FLUS reference architecture and include a remote control interface as depicted herein. The new FLUS Remote Control connection (F-RC) is established and maintained by the FLUS Source but used by a FLUS sink for remote control instructions.

It should be possible that a FLUS Source connects to several FLUS RC functions

Note, whether the remote control commands are defined under F-C umbrella or a new interface name is selected (like F-RC) is for further study. However, current F-C is a FLUS-Sink Provisioning interface and does not contain means so that the FLUS Source establishes a push.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for uplink streaming, the method comprising:
a Framework for Live Uplink Streaming (FLUS) source initiating establishment of one or more associations with a set of controller nodes comprising at least a first controller node, wherein initiating the establishment of the associations comprises the FLUS source establishing a connection with a session orchestrator and sending a message to the session orchestrator;
the FLUS source receiving a first command transmitted by the first controller node;
the FLUS source controlling a FLUS media source of the FLUS source based on the first command; and
after controlling the FLUS media source, the FLUS source streaming media to a FLUS sink.

2. The method of claim 1, wherein
controlling the FLUS media source comprises relaying the first command to the FLUS media source, and
the method further comprises the FLUS source verifying that the first controller node is authorized to issue the first command prior to relying the first command to the FLUS media source.

3. The method of claim 1, wherein
the FLUS source comprise a camera; and
the first command causes the FLUS source to adjust the camera.

4. The method of claim 1, wherein the first controller node is located remotely from the FLUS source.

5. The method of claim 1, wherein the FLUS source sends an indication of availability for streaming to the session orchestrator.

6. The method of claim 1, wherein first controller node is an editing controller or a bitrate controller.

7. A computer program product comprising a non-transitory computer readable medium storing a computer program comprising instructions which, when executed by processing circuitry of a Framework for Live Uplink Streaming (FLUS) source causes the FLUS source to perform the method of claim 1.

8. The method of claim 1, wherein
first controller node is a bitrate controller, and
the first command is a command to increase or decrease a bitrate of the media streamed to the FLUS sink.

9. The method of claim 1, wherein
first controller node is an editing controller, and
the first command is a command that causes the FLUS source to begin the streaming of the media to the FLUS sink.

10. The method of claim 1, wherein
the set of controller nodes further comprise a second controller node, and
the method further comprises:
the FLUS source receiving a second command transmitted by the second controller node; and
the FLUS source controlling a camera associated with the FLUS media source based on the second command.

11. A Framework for Live Uplink Streaming (FLUS) source, the FLUS source comprising:
memory; and
processing circuitry coupled to the memory, wherein the FLUS source is configured to perform a process comprising:
initiating establishment of one or more associations with a set of controller nodes comprising at least a first controller node, wherein initiating the establishment of the associations comprises the FLUS source establishing a connection with a session orchestrator and sending a message to the session orchestrator;
controlling a FLUS media source of the FLUS source based on a first command transmitted by a first controller node; and
after controlling the FLUS media source, streaming media to a FLUS sink.

12. The FLUS source of claim 11, wherein the process further comprises:
the FLUS source verifying that the first controller node is authorized to issue the first command prior to relying the first command to the FLUS media source.

13. The FLUS source of claim 11, wherein the first controller node is authorized to send commands to control a camera associated with the FLUS media source.

14. The FLUS source of claim 11, wherein the first controller node is located remotely from the FLUS source.

15. The FLUS source of claim 11, wherein the FLUS source sends an indication of availability for streaming to the session orchestrator.

16. The FLUS source of claim 11, wherein first controller node is an editing controller or a bitrate controller.

* * * * *